Dec. 9, 1958  A. F. HAUCH ET AL  2,863,677
SEPARABLE CASING FITTING FOR CARBON PIPE
Filed Aug. 5, 1957  2 Sheets-Sheet 1

INVENTORS
ALBERT F. HAUCH
SAMUEL H. S. RAUB
BY Richard S. Shreve, Jr.
ATTORNEY

Dec. 9, 1958 A. F. HAUCH ET AL 2,863,677
SEPARABLE CASING FITTING FOR CARBON PIPE
Filed Aug. 5, 1957 2 Sheets-Sheet 2
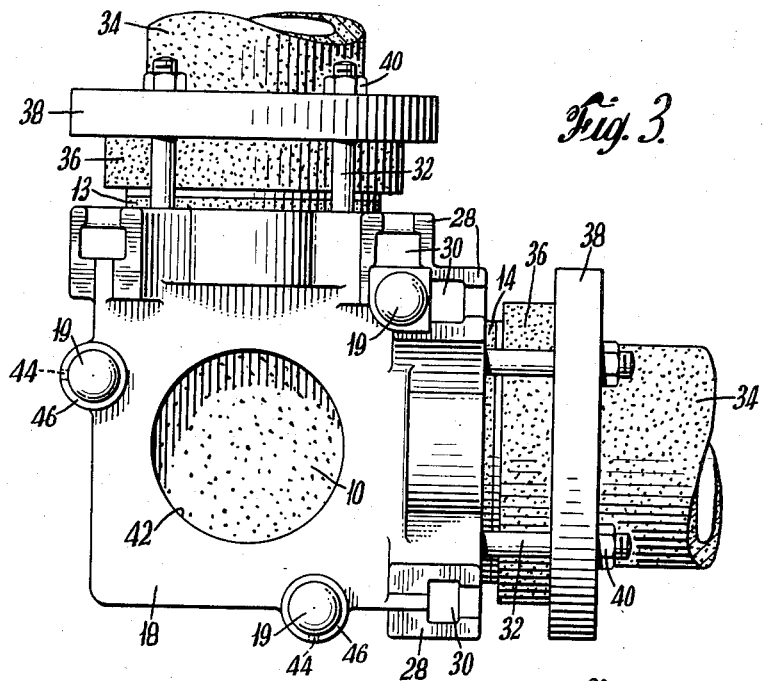
Fig. 3.
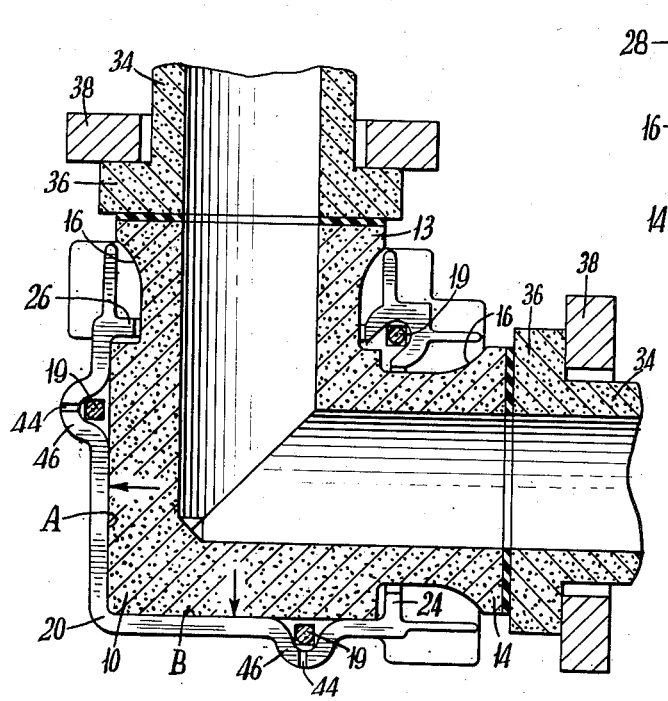
Fig. 4.
Fig. 5.
INVENTORS
ALBERT F. HAUCH
SAMUEL H. S. RAUB
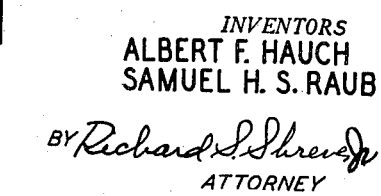
ATTORNEY United States Patent Office 2,863,677
Patented Dec. 9, 1958

2,863,677

SEPARABLE CASING FITTING FOR CARBON PIPE

Albert F. Hauch, Cleveland, and Samuel H. S. Raub, Bay Village, Ohio, assignors to Union Carbide Corporation, a corporation of New York Application August 5, 1957, Serial No. 676,243

2 Claims. (Cl. 285—45)

This invention relates to armored carbon pipe fittings, and more particularly to elbows, T's, nipples and the like for joining lengths of pipe constructed of carbon or graphite composition.

The main objects of the invention are to stress the composition in compression only, to protect the composition from external blows, to carry the tension in the metal armor, and to make bolts easily removed or replaced.

The metal armor comprises complementary armor casing halves adapted to receive and hold a composition fitting when assembled in such a manner that the fitting is retained therein in tensional stress relieved relationship, the tensional stress normally applied to such fittings being taken up by the armored fitting.

In the drawings:

Figure 3 is an elevation of an elbow pipe fitting corresponding to the T of Figure 1;

Figure 4 is a vertical section through the center of Figure 3; and

Figure 5 is an enlarged view of a portion of Figure 4, showing the installation of the square head bolts in the T slot.

Figure 1:
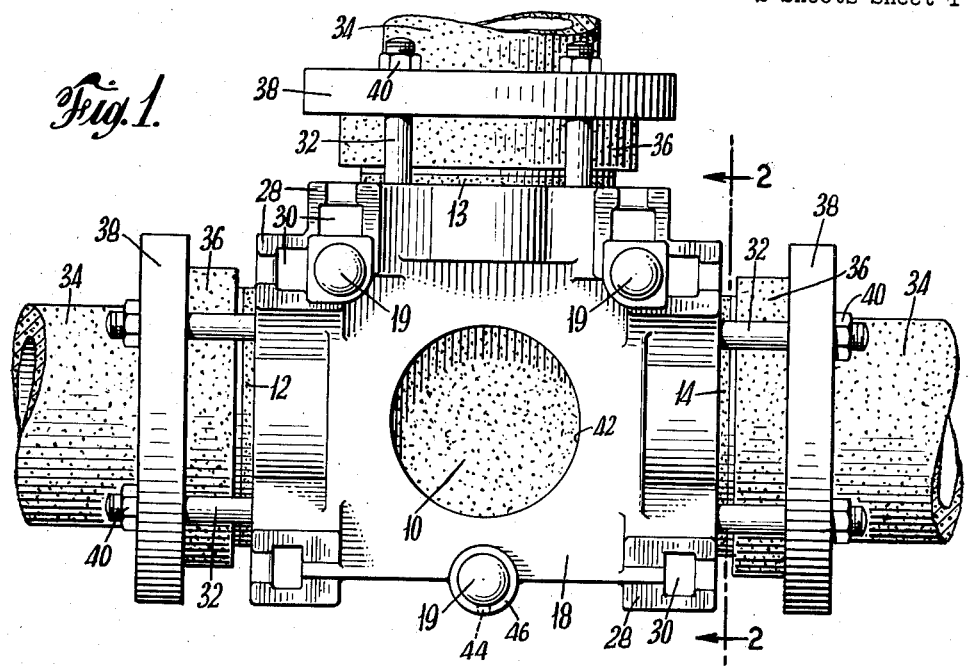
Figure 1 is an elevation of a metal armored carbon pipe T fitting according to the preferred embodiment of the present invention.
Figure 2:
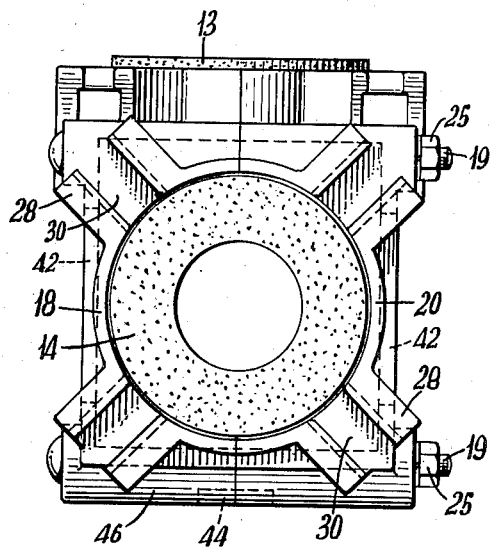
Figure 2 is a vertical section taken along the line 2—2 of Figure 1 with the square head bolts in the T slots removed.

As shown in the drawings, the armored fitting comprises a thick solid walled core 10 of carbon composition having angularly disposed outlet necks 12, 13 and 14 provided with outwardly flared external annular surfaces 16. The core 10 is inclosed in substantially rectangular complementary metal armor casing halves 18 and 20 having concave interiors loosely fitting and surrounding the core 10 with a clearance. The halves 18 and 20 are divided in the plane of the axes of the outlet necks 12, 13 and 14 and bolted together at the corners by carriage bolts 19 extending transversely to the plane of division and tightened by nuts 25.

The casing halves 18 and 20 have terminal annular flanges 24 and 26 directed inwardly to loosely surround the outlet necks 12, 13 and 14. These flanges have cast radial bosses 28 provided with T slots 30 to receive the square heads of take up bolts 32 extending parallel to their respective outlet necks. The heads of the bolts 32 if occasionally engaged by the flared external surfaces 16 are spread by these flared surfaces instead of hooking onto and breaking them off.

The outlet necks of the assembled and bolted fitting are joined to respective pipe lengths 34 having annular flanges 36. Coupling rings 38 surrounding the pipe 34 outside of the flanges 36 are drilled to receive the ends of take up bolts 32 which are tightened by nuts 40.

Referring to Figures 4 and 5, when the take up bolts 32 for the neck 14 are tightened, the thrust seats the body 10 on the far wall of the housing at A, leaving clearance at all other surfaces. Connection to the second outlet neck 13 forces the body into the corner seating on the bottom wall of the housing at B. Clearance is provided at all times between the necks of the outlets and the metal housing so that the necks can never be loaded in shear. Thus, the carbon or graphite body 10 is at all times carried in compression by this construction while any tensional load to the fitting is carried by the metal armored halves 18 and 20.

The walls against which the sides of the body 10 are pressed are lightened by large holes 42 in line with the outlets. Thus the unit and total pressures are almost the same for the L's as they are for the T's and crosses, where thrust inside the housing is carried largely by the four corners. The T slots 30 are cast in place, and allow the use of standard square head bolts 32 instead of drilled and tapped studs. If the nuts 40 became rusted fast to these bolts, the bolts can be removed by sawing across the shanks and new bolts can then be easily put in their places without the necessity of removing the rusted studs and redrilling and tapping for new ones.

The oversize of fitting and thus its cost can be held down by gradually enlarging the nozzle neck from the undercut diameter which normally clears the bolt heads. The bolt head which at extremes of position might otherwise pull up against an overhanging collar and chop it out is carried outward by the flared surface 16 on the neck. The same flare buttresses the gasket face better than a sharply undercut collar section would. The bolt loads applied by bolts 32 to the armor from the connections are so directed that very little force is needed to hold the halves 18 and 20 of the clamshell construction together. These connection bolt loads do not tend to force the halves apart. The carriage bolts 19 used to hold the halves 18 and 20 together are much larger than actually needed but the extra size provides longer life under corrosive attack.

None of the bolts either connection 32 or casting fasteners 19, passes through holes in the carbon composition bodies 10, so that foliation or growth of bolt shanks cannot split the carbon compositions. When the bolt shanks pass through grooves or trough sections 46 in the castings 18 and 20, these troughs are slotted as at 44 for complete drainage in any position to prevent collection of stagnant waters or chemical solutions.

In summation, the bodies 10 are loosely held in cast iron armor 18 and 20 until the fittings are connected to the piping. Thereafter all loads on the carbon composition are compressive. The bolts 32 making connections are standard square head bolts sliding in T slots, easily removed and replaced, and are prevented by cam action on the flared surface 16 of the outlet nozzle necks 12, 13 and 14 from pulling off the ends of the nozzles. The carriage bolts 19 fastening halves 18 and 20 of clamshell castings together are not loaded by connections made to outlets of assembled fittings by bolts 32.

What is claimed is:

1. An armored fitting for connecting pipe of carbon composition having terminal flanges with gasket faces, comprising a solid walled hollow insert of carbon composition having angularly disposed outlet necks provided with gasket faces to mate with said pipe flange faces, a housing comprising complementary casing halves loosely surrounding said hollow insert and engaging the outer portions of said insert opposite said gasket faces, said housing having terminal annular flanges concentric with said outlet necks, carriage bolts out of contact with said carbon composition hollow insert securing said halves together, coupling rings surrounding the pipe outside of their terminal flanges, and means comprising take-up bolts perpendicular to said carriage bolts and having heads engaging the inner sides of said armor flanges and bridging over outside of said pipe flanges and passing through registering apertures in said coupling rings to bring said gasket faces together upon a gasket in fluid-tight relation and to place said core of carbon composition in compression between the gasket faces and the far inner walls of said armor housing.

2. An armored fitting for connecting pipe of carbon composition having terminal flanges with gasket faces, comprising a solid walled hollow insert of carbon composition having angularly disposed outlet necks provided with gasket faces to mate with said pipe flanges, said necks also having outwardly flared external annular surfaces, a housing comprising complementary casing halves loosely surrounding said hollow insert and engaging the outer portions of said insert opposite said gasket faces, said housing having terminal annular flanges concentric with said outlet necks, said housing flanges having cast radial bosses provided with T-slots, carriage bolts out of contact with said carbon composition hollow insert securing said halves together, coupling rings surrounding the pipe outside of their terminal flanges, and means comprising take-up bolts perpendicular to said carriage bolts and having heads mounted in said T-slots and cammed outwardly along said slots by said outwardly flared external annular surfaces and engaging the inner sides of said armor flanges, said take-up bolts bridging over outside of said pipe flanges and passing through registering apertures in said coupling rings to bring said gasket faces together upon a gasket in fluid-tight relation and to place said core of carbon composition in compression between the gasket faces and the far inner walls of said armor casing.

References Cited in the file of this patent

UNITED STATES PATENTS

| | | |
|---|---|---|
| 639,198 | McDonald | Dec. 12, 1899 |
| 1,230,007 | Milliken | June 12, 1917 |
| 1,572,781 | Farmer | Feb. 9, 1926 |
| 1,681,381 | Tolman | Aug. 21, 1928 |
| 1,781,849 | Kiesel | Nov. 18, 1930 |
| 2,106,183 | Lowy | Jan. 25, 1938 |
| 2,412,394 | Giles | Dec. 10, 1946 |
| 2,589,136 | Ralston | Mar. 11, 1952 |

OTHER REFERENCES

National and Karbate Catalog Section M–8000–D, of the Union Carbide and Carbon Corporation, 20 East 42nd St, New York 17, New York.